United States Patent [19]

Drimak

[11] 3,889,243

[45] June 10, 1975

[54] STACK MECHANISM FOR A DATA PROCESSOR

[75] Inventor: Edward G. Drimak, Johnson City, N.Y.

[73] Assignee: International Business Machines Corporation, Armonk, N.Y.

[22] Filed: Oct. 18, 1973

[21] Appl. No.: 407,688

[52] U.S. Cl. .............................................. 340/172.5

[51] Int. Cl. .............................................. G06f 13/00

[58] Field of Search .................................. 340/172.5

[56] References Cited

UNITED STATES PATENTS

| | | | |
|---|---|---|---|
| 3,047,228 | 7/1962 | Bauer | 340/172.5 |
| 3,200,379 | 8/1965 | King et al. | 340/172.5 |
| 3,218,611 | 11/1965 | Kilburn et al. | 340/172.5 |
| 3,401,376 | 9/1968 | Barnes et al. | 340/172.5 |
| 3,546,677 | 12/1970 | Barton et al. | 340/172.5 |
| 3,601,809 | 8/1971 | Gray et al. | 340/172.5 |
| 3,614,746 | 10/1971 | Klinkhamer | 340/172.5 |
| 3,624,616 | 11/1971 | Patel | 340/172.5 |
| 3,786,432 | 1/1974 | Woods | 340/172.5 |

*Primary Examiner*—Gareth D. Shaw
*Assistant Examiner*—Michael C. Sachs
*Attorney, Agent, or Firm*—John C. Black

[57] ABSTRACT

A storage device (hereinafter referred to as a high speed store) includes a plurality of registers or locations and has an access speed compatible with that of its processor. Operand and operator entries are entered into one group of said registers in descending and ascending order from opposite ends thereof (a push operation) and removed therefrom (a pop operation) for processing each entry type in a last-in-first-out order. The group of registers is hereinafter referred to as a high speed stack. The number of entries stored in the stack at any moment can become very large due to the nesting of operators. Since it is not economically feasible to provide a large capacity high speed stack, overflow of the stack into a slower speed storage device (hereinafter called a low speed stack) is provided. "Roll out" of entries to the low speed stack and "roll in" of the entries back to the high speed stack is effected as the high speed stack becomes full and empty. When a new entry is to be stored into the high speed stack (a push operation) and the stack is full after the entry is stored therein, the entries are rolled out from the high speed stack to the low speed stack. Pointers (stack addresses), together with their pointer registers, pointer updating circuits and pointer controlled logic, automatically select the stack registers as entries are pushed thereon and popped therefrom. When entries are rolled out, the pointers are rolled out with the entries and the pointer registers are reinitialized. When the entries are subsequently rolled in, their pointers are rolled in and set in the pointer registers. Hardware is provided for reserving some of the high speed stack registers for direct addressing by instructions rather than by the automatic pointer addressing mechanism.

5 Claims, 32 Drawing Figures

STACK MECHANISM FOR A DATA PROCESSOR

BACKGROUND OF THE INVENTION

This invention relates to data processors which are organized so as to operate according to a machine language which is closely related to high level problem program languages. Examples of such a processor are shown in U.S. Pat. Nos. 3,200,379 and 3,401,376, and in copending applications Ser. Nos. 299,499 and 373,847, assigned to the same assignee as the present application.

In any processor using a stack mechanism to store operators and/or operands, it is desirable to have the stack contained in a storage media with a speed compatible to the speed of the processor itself. This is not always economically feasible because the number of entries on the stack can become very large due to the nesting of operators.

The conventional solution for this is to have some fixed number, X, of high speed storage locations and allow any overflow to be contained in a slower speed storage media. Normal operation when high speed storage is full, is to roll out its X entries into the slower speed storage. Now the high speed storage locations are again available for storing (pushing) X number of entries onto the stack.

SUMMARY OF THE INVENTION

The preferred embodiment of the improved addressing structure described in this application provides the ability to directly probe the top four registers of a data stack, while maintaining a straightforward algorithm for the rolling in and out of entries to and from the stack.

It is therefore the primary object of the present invention to provide an economical, simplified hardware mechanism for providing a probing capability in a stack mechanism.

A two stack mechanism may be employed to execute a computer program represented as a tree structure whose nodes are operators and whose leaves are operands. One can use one stack to save operator entries and the other to save operand entries and other data until all operands for a given operator have been evaluated. Usually, the stack mechanism is defined to exist in main storage. In implementing the mechanism, it is desirable to shade the top portion of the two stacks in a faster local storage technology in order to improve performance. This application describes such a shading or mapping of two stacks on a linearly addressable local storage.

In the preferred embodiment, it is assumed that the registers of the local storage stack can be linearly addressed from address 0 (binary 0000) to 15 (1111) and, in general, are addressable by some set of microprogram instructions. Fifteen is an arbitrary maximum address value and is used merely by way of example to illustrate the invention.

The local storage or high speed stack is divided into two areas referred to as stack hi and stack lo. In the embodiment illustrated, stack hi begins with the register at address 0 and receives operator entries in ascending address order. Stack lo begins with the register at address 15 and receives operand entries in descending address order.

In normal operation, an operator A to be executed is loaded into an operator register. Should the execution of operator A require the execution of some other operator B prior to completion of operator A, an operator entry for A is pushed onto stack hi. Operator B is loaded into the operator register. The operand stack is then used to evaluate operator B's operands and execute operator B. Upon completion of operator B, control is returned to operator A by popping the operator A entry from stack hi and reloading operator A into the operator register. Operator entries in stack hi also include the value of the pointer to stack lo which exists when the operator entry is pushed on the stack. This pointer to stack lo is made the current stack lo pointer after the operator entry (of which it is a part) is popped from the stack. This eliminates the need to pop already used entries on the operand stack prior to reloading the operator register by popping the operator stack. This proves very convenient when the operand stack contains intermediate result values in arithmetic operations or if abnormal termination of operator execution occurs due to either a machine or program malfunction.

A microprogram instruction type is provided for pushing entries onto either stack. This instruction type causes the writing of information into registers specified by a stack hi pointer or alternatively a stack lo pointer held in respective hardware registers. The instruction also causes the stack hi address to be incremented or the stack lo address to be decremented, depending upon the storing of either an operator or an operand entry.

Similarly, another microprogram instruction type is provided for popping operand and operator entries from the stack lo and stack hi areas. This microprogram instruction causes an operand or operator entry to be read from the stack lo or stack hi area and will cause the stack lo or stack hi address to be respectively decremented or incremented.

In the event that a push operation results in the stack hi pointer having a greater value than the stack lo pointer (indicative of the fact that the stack hi and lo areas are full), the logic circuitry is rendered effective for initiating the roll out of the entire high speed stack into a low speed stack in main storage. The stack hi and stack lo addresses which exist at the completion of the push operation are also rolled out with the entries. After the roll out operation is completed, the stack hi register is reinitialized to 0 and the stack lo register is reinitialized to 15. The next microprogram instruction is now executed.

If a pop operation is attempted to pop an operator when the stack hi pointer equals 0 (no operator entries are in the stack) or to pop an operand when the stack lo pointer equals 15 (there are no operand entries in the stack), then the most recently rolled out copy of the high speed stack is reloaded, i.e., rolled in, into the high speed stack. The stack hi and stack lo values stored with the most recently rolled out copy are set back into their respective registers. The pop operation is then attempted.

It is assumed that the roll out area (low speed stack) in main storage can be managed as appropriate in blocks equal in size to the high speed stack plus the contents of the stack hi and stack lo registers.

At times it is very useful to be able to probe (directly address) into the operand stack without having to pop entries from the stack until the desired entry is reached. However, this becomes very difficult if there is no guarantee that the desired entry is indeed in the high speed stack. The control of the high speed stacks is complicated because only the desired entry should be effected. Roll in cannot just overlay the high speed stack with the most recently rolled out copy of the high speed stack. This would destroy operand stack entries between the top of the operand stack and the desired entry. To avoid the complexity, a mechanism is introduced to guarantee that a set of entries that are to be probed always reside in the high speed stack when they are being probed.

The preferred embodiment of the improved local storage addressing mechanism provides a probing facility to the top (most recently entered) four entries on the operand stack and still permits the same roll in and roll out mechanism to be used.

The improved local storage addressing mechanism is controlled by the use of a push-like microprogram instruction which does not store any information on the operand stack; rather it merely signals an intent to later be able to directly address the top 1, 2, 3, or 4 entries of the operand stack. This microprogram instruction causes the stack lo pointer to be decremented by either 1, 2, 3 or 4, depending upon the number of registers to be reserved for probing. The logic which normally determines whether the stack hi pointer has a value greater than the stack lo pointer for causing a roll out routine during push operations is used to guarantee that all 1, 2, 3 or 4 top locations of the operand stack will never be separated across two consecutive mappings of the local store stack. That is, the reserved entry positions must be within the same high speed stack copy. The improved local storage mechanism provides the probing facility by permitting normal microprogram instructions to specify any one of the top four locations of the operand stack directly.

The preferred embodiment of the improved local storage mechanism which provides the probing facility comprises circuit means responsive to a push-like microprogram instruction for reserving one or more of the operand stack entries, for decrementing the stack lo pointer by a value equal to the number of locations reserved, and for storing the decremented value back into the stack lo register. When it is subsequently desired to select one of the reserved locations and read the data therefrom, the current microprogram instruction renders circuit means effective to increment the stack lo pointer by a value corresponding to the reserved location. It will be appreciated that at the initiation of this microprogram word, the stack lo pointer must be at the top of the reserved area, i.e., pointing to one register ahead of the most recent register position in the reserved area. The incremented stack lo pointer is then used to access an entry from the corresponding position in the high speed stack without having to first pop intermediate entries from the stack.

Logic means responsive to an underflow condition (subtract one from zero) in the stack hi pointer register and to an overflow condition (add one to fifteen) in the stack lo pointer register initiate roll in routines. Circuit means for comparing the stack hi and stack lo pointers initiate a roll out routine when the value of the stack hi pointer exceeds that of the stack lo pointer.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Description of General System

Figure 1:
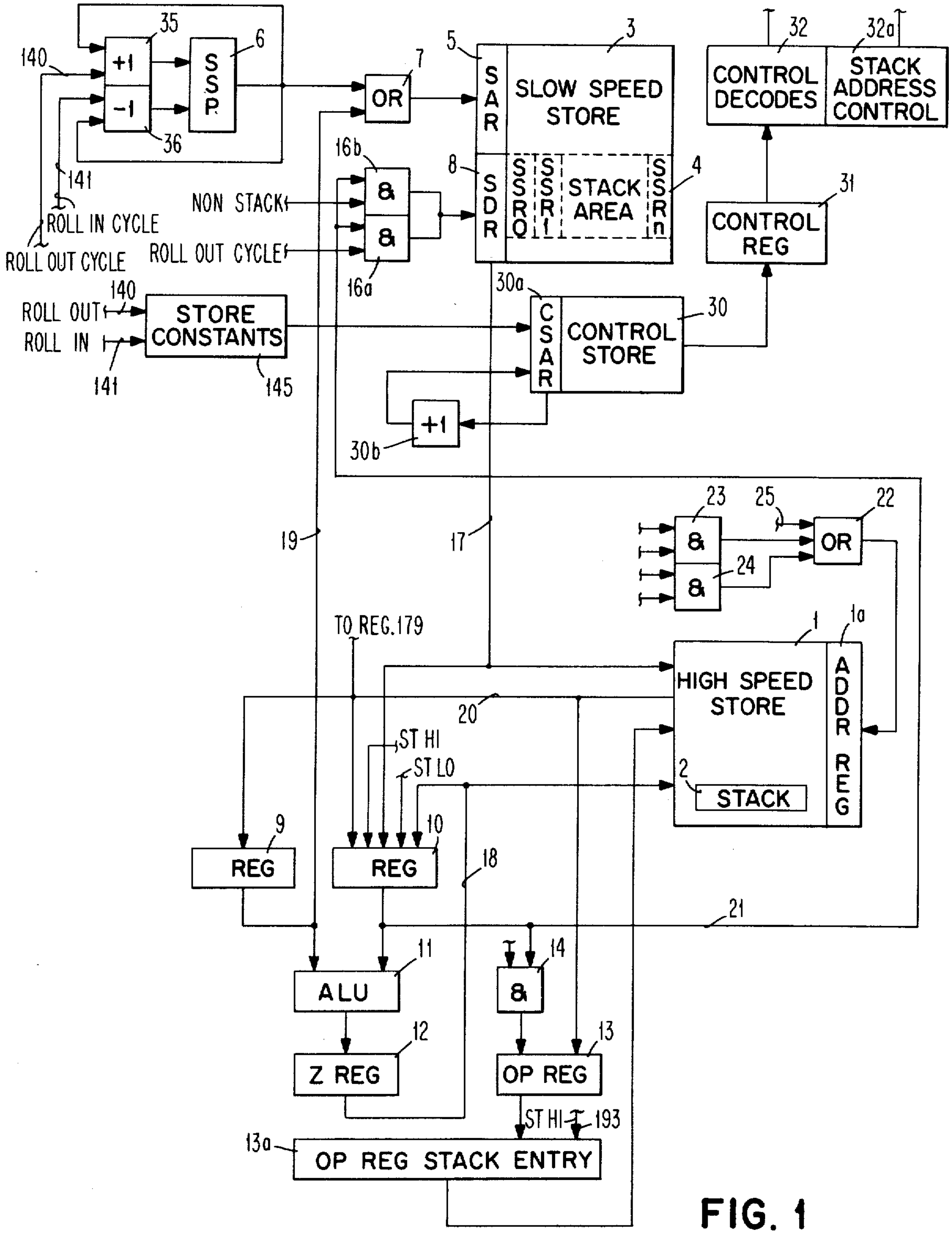
FIG. 1 is a diagrammatic illustration of a data processing system incorporating the present improvement.

The system illustrated diagrammatically in FIG. 1 preferably uses microprogram control and data paths generally of the type illustrated in detail in U.S. Pat. No. 3,656,123, issued Apr. 11, 1972. Gates controlled by the microprogram will not therefore be shown. Briefly the system includes a conventional main store 3 and a processor including an ALU 11 and a high speed local store 1 associated with the processor. Input registers 9 and 10 are provided for the ALU 11 and a Z register 12 is provided at the ALU output. The processor is preferably of the type which is operated in accordance with microprogram control word routines which are held in a control store 30. As each control word is read from the store 30, it is entered into a control register 31. Control decode circuits 32 and 32*a* operate the processor through a machine cycle in response to each control word entered into the register 31. The decode circuits 32 and 32*a* and a clock (not shown) energize gating (AND) circuits (not shown) to perform logical and arithmetic calculations and to complete the data paths for effecting the transfer of data throughout the system in a known manner.

The processor utilizes a stack mechanism 2 in the high speed store 1 to contain operators/operands and uses a stack area 4 in the slower speed store 3 to contain any stack overflow from the high speed store 1. In the preferred embodiment, stack 2 includes 16 unique locations or registers HS0–HS15.

The stack 2 is accessed via OR circuit 22 and AND circuits 23, 24 by a stack lo pointer STLO (FIG. 2) and a stack hi pointer STHI as will be seen later. The non-stack portion as well as the stack portion of store 1 is accessed via address bus 25. It is assumed in the preferred embodiment that the registers HS0–HS15 are the actual addresses 0–15 of local store 1. This results in their high order address bits all being zero. The bus 25 can provide these high order zeros.

Pointers STHI and STLO in registers 150 and 179 (FIG. 2) are used to access the stack 2 during push (store) and pop (read) operations. All such accesses are to the stack 2. All other accesses to the store 1 are by way of address bus 25.

Store 3 has a plurality of word locations for storing entries including stack locations SSRO-SSRN. Bus 17 and input/output storage data register (SDR) 8 provide a path for data (operators/operands) from the store 3 to store 1 and register 10. Operators may then be transferred from register 10 via bus 21 and AND block 14 into the OP register 13. During roll in operations from stack area 4 to stack 2, data is transferred via bus 17, directly to store 1. Bus 18 and a Z register 12 allow intermediate results of ALU 11 functions to be placed on (push) the stack 2 or returned to the register 10 or register 9 for further processing.

Store 1 has a plurality of work locations for storing entries, including stack locations HS0–HS15. Information from store 1 is read out on bus 20 to either the register 10 or the register 9. This information can be gated to the ALU 11 for arithmetic or logical operations. The output of store 1 is set into OP register 13 via bus 20 when an operator entry is popped from the stack 2. The output of the register 10 is gated via bus 21, AND circuit 16a, and the SDR register 8 to the stack area 4 of slow speed storage 3 on a roll out operation. Bus 21 and AND gate 16b provide a path from the register 10 to store 3 for non-stack data store operations.

A storage address register (SAR) 5 is used for addressing main store 3. The output of the register 9 is gated via bus 19 and OR circuit 7 to the SAR register 5 for accessing store 3.

Incrementer 35 (FIG. 1) and decrementer 36 update the pointer SSP in register 6 to access registers SSRO-SSRN during roll out and roll in operations via OR circuit 7 and storage address register 5. Signals on lines 140, 141 respectively force fixed branch addresses from store 145 to the control storage address register 30a of the control store 30 causing a branch to the first microinstruction of the roll out and roll in routines respectively. Incrementer 30b increments the address in register 30a during each roll out and roll in microinstruction execution cycle to permit fetching of the next microinstruction in the routine.

Figure 2:
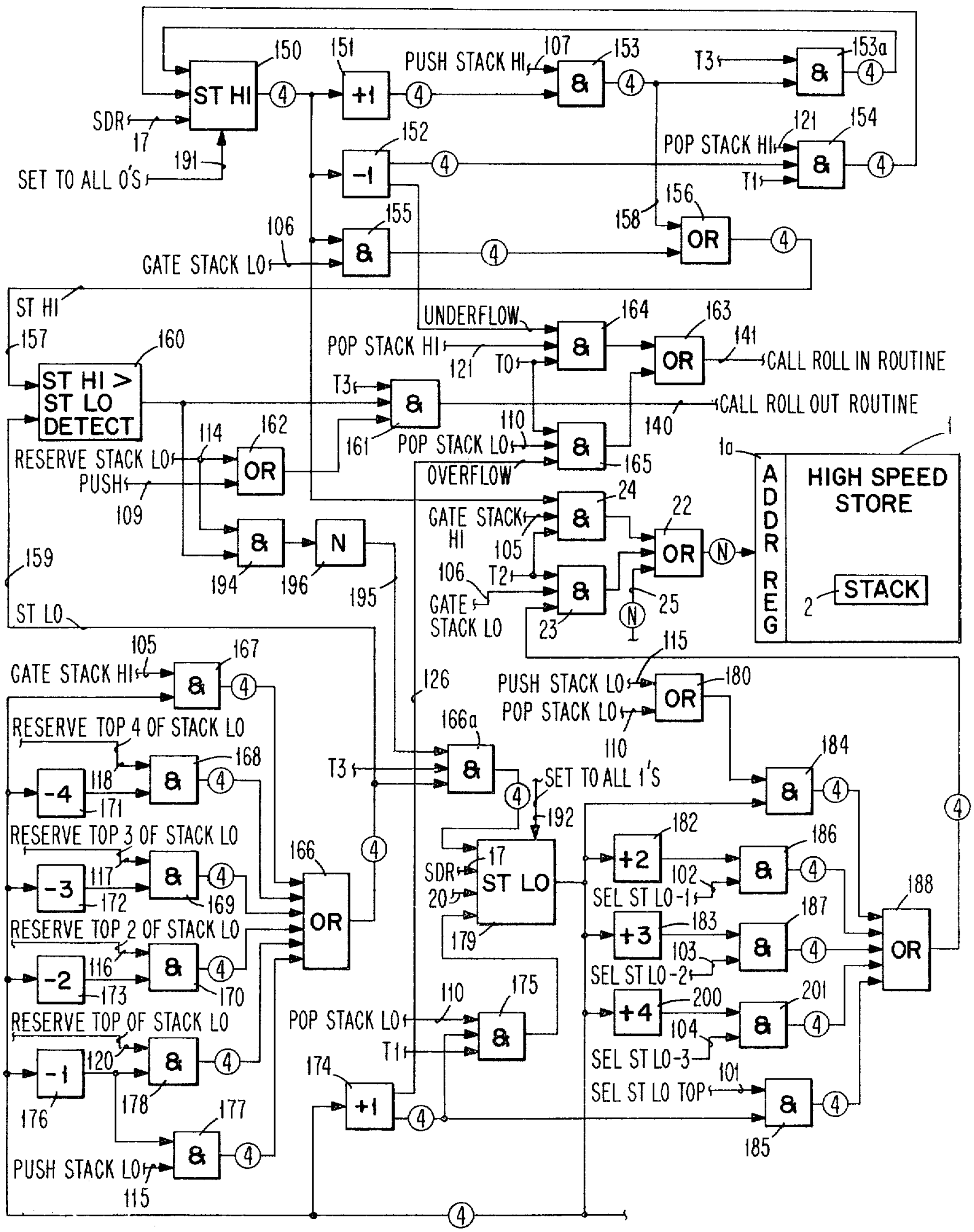
FIG. 2 is a schematic diagram of a preferred form of the stack addressing mechanism.
Figure 3:
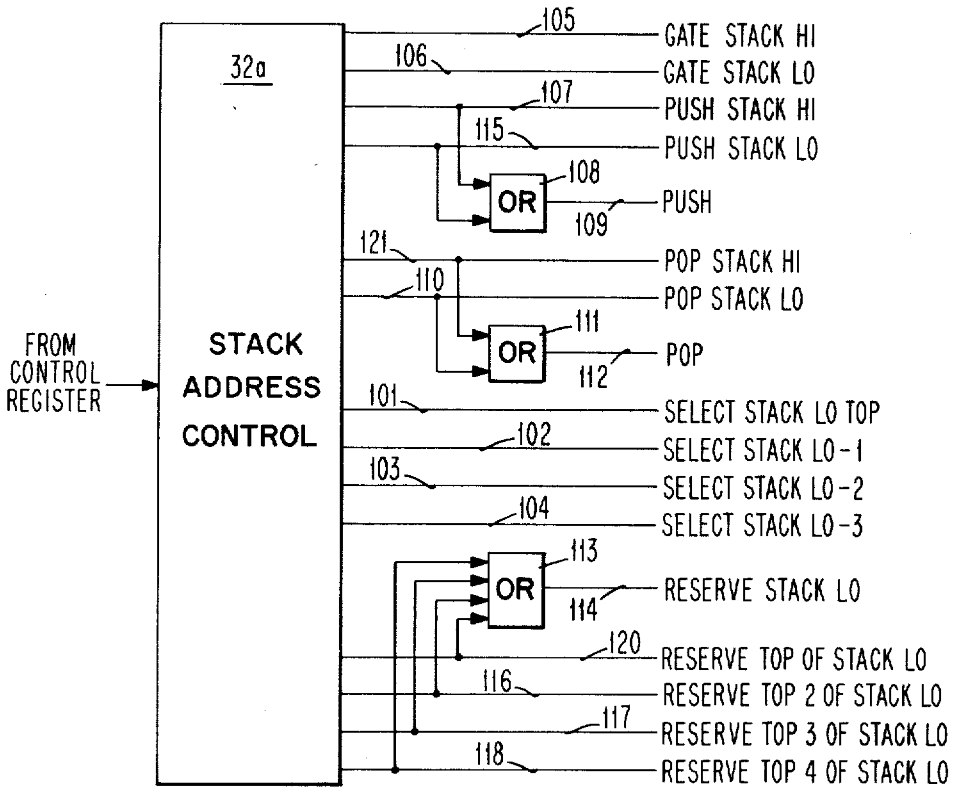
FIG. 3 is a diagrammatic illustration of the microinstruction decode output for controlling the stack addressing mechanism.

FIGS. 2 and 3 show the hardware necessary for addressing and control of the stack 2 in high speed storage 1. The numeral 4 has been inserted in most data paths for ease of distinguishing address buses from gating lines.

The stack 2 requires $2^n$ entry positions in order to permit an economically feasible wraparound address updating mechanism (i.e., registers 150, 179, incrementers 151, 174, and decrementers 152, 176) for pointers STHI and STLO. For purposes of explanation, stack 2 is shown to contain 16 entries, HS0–HS15, which can be accessed by four binary address bits.

Decrementing circuits 171, 172, 173, 176, their output gates 168, 169, 170 and 178 and OR circuit 166 are provided to update the pointer STLO in register 179 during reserve top of stack lo operations.

Incrementing circuits 174, 182, 183, 200, their output gates 185, 186, 187, 201 and OR circuit 188 are provided for rapid accessing of a desired register in stack 2 during probing operations to select an address other than the stack top in the "reserved" area of stack 2.

Figure 4:
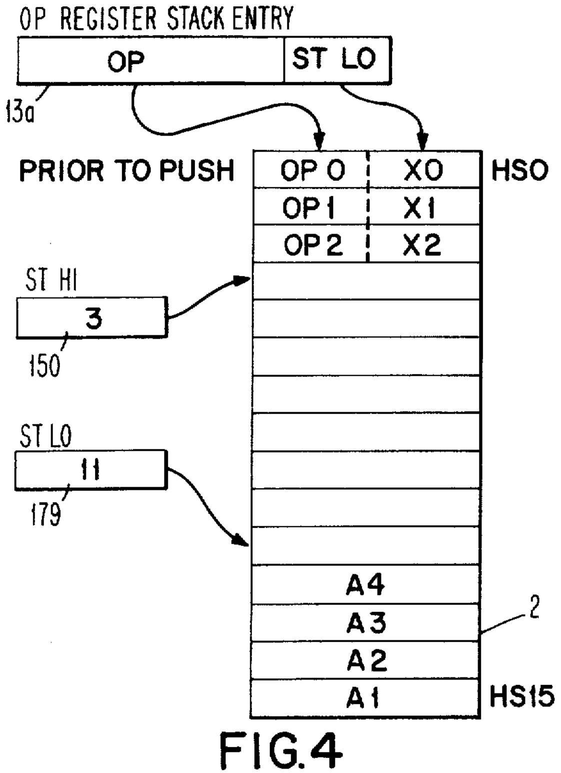
FIGS. 4–32 inclusive illustrate the operation of the improved stack addressing mechanism by showing the status of the high speed stack before and after various operations.

Stack mechanism 2 is partitioned into two substacks (see FIG. 4). The two substacks are used as an operator stack and an operand stack in much the same fashion as the two stack execution model previously described in the background of the invention. The operator substack begins at the first entry location HS0 in stack 2 and grows in ascending address order. The operand substack begins in the sixteenth entry location HS15 and grows in descending address order. The addresses STHI (stack hi) and STLO (stack lo) of the next entries to be pushed on either the operator or operand substacks are contained in registers 150 and 179 respectively. Hereafter, the operator stack will be referred to as stack hi and the operand stack will be referred to as stack lo.

Microinstructions in control store 30 exist to control the addressing, pushing and popping of entries in each of the two substacks in stack 2. Decode circuits 32a and OR circuits 108, 11, and 113 (FIG. 3) develop the various gating signals to control the stack mechanism.

In normal operation, pushing on stack hi causes OP (operation) register 13 and register 179 (FIG. 2) to be merged by circuitry 13a into an operator stack entry, that is the data that is written into stack hi. This merging causes the address STLO, which exists when an operator is pushed on stack hi, to be stored with the operator. This address is the beginning address for subsequently received operands associated with the operator. Popping an operator entry from stack hi causes OP register 13 to be reloaded from stack 2 via bus 20 and the register 179 to be reloaded from bus 20. This synchronization of the two substacks eliminates the necessity of having to pop no longer needed operand entries from stack lo once the execution of a given operator in OP register 13 is completed by popping the most previous operator entry from stack hi. In general, the normal sequence of events is to push an operator entry onto stack hi, load a new operator into the OP register 13, push its operands on stack lo, use stack lo for further computation, pop operands from stack lo, and finally, complete execution of the operator in OP register 13 via a return to execution of the previous operator by popping the operator entry from stack hi. At the latter point in time, stack lo is again sitting at the state that existed when the operator entry was pushed onto stack hi.

Should stack 2 become full during a push or reserve stack operation, which is detected by circuits 160 and 162 (FIG. 2), a call is made via AND block 161, line 140, and store 145 to a roll out microprogram (in store 30) that stores the contents of stack 2 and the values in registers 150 and 179 into the variable sized stack area 4 in slow speed store 3. At the termination of the roll out routine, register 150 is reset to zero via signal line 191 to point to the first location HSO of stack hi. Register 179 is set to fifteen via signal 192 to point to the first location HS15 of stack lo. The two substacks, thus, have been initialized to again begin to grow.

If roll out was due to a push operation, execution continues at the next microinstruction. If roll out was due to a reserve stack operation, execution resumes by again executing the reserve operation.

Should either of the two substacks become empty and a pop operation accesses the empty substack, blocks 165, 174 or blocks 164, 152 initiate a call via OR block 163, line 141 and store 145, to a microprogram (in store 30) that loads stack 2, register 150 and register 179 from stack area 4 in slow speed store 3 via bus 17. This information was previously rolled out as a result of the last roll out call. Execution resumes by again executing the pop operation.

A specific microinstruction read from control store 30 may control and address stack 2 in a variety of ways. A microinstruction loaded into control register 31, which activates decode circuitry 32a, may push data onto either stack hi or stack lo, may pop data from either stack hi or stack lo, may reserve up to four of the top entries of stack lo in order to directly reference ıese entries at some later point, and may directly ref-·ence entries on stack lo that was previously reserved. ·ollowing is a description showing how the stack mech-ıism functions to provide these various control and ıddressing functions. For ease of illustration, it is as-ımed that stack 2 comprises registers with the lowest 6 address values in store 1 and high order zeros are ɔplied via bus 25 to the address register 1*a* in conjunc-on with the four bit address STLO, STHI.

Pushing an entry on to stack hi (FIGS. 4–8)

In normal operation, an operator entry in OP register 3 is pushed on to stack hi at the address STHI in regis-:r 150. The microinstruction to perform this function . read from control store 30 into control register 31. 'he GATE STACK HI, PUSH STACK HI, and PUSH .gnals on lines 105, 107, and 109 respectively are acti-ated by decoder 32*a*. Address STHI in register 150 is ated to the address register 1*a* of stack 2 at T2 time ia AND gate 24 and OR gate 22. Into this address is /ritten the contents of OP register 13 and address TLO of register 179 combined into an operator entry ·y circuits 13*a*, e.g. Op3,11 in FIGS. 4 and 5. After the ccess (T3 time), address STHI in register 150 is incre-ıented by one via +1 circuit 151 and gates 153 and 53*a*.

Figure 5:
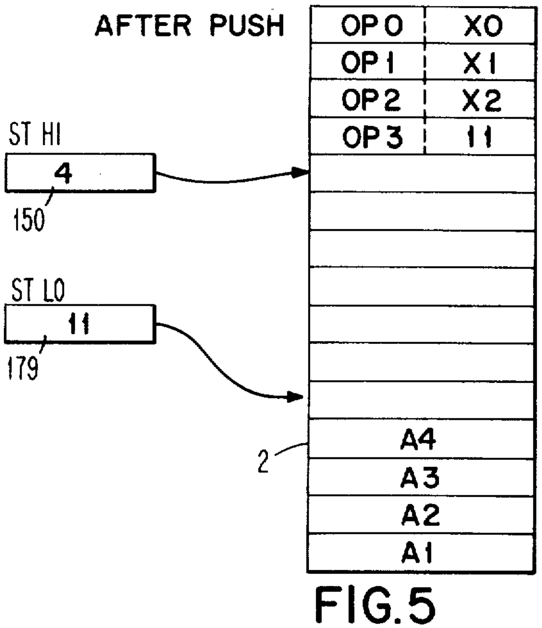
Figure 6:
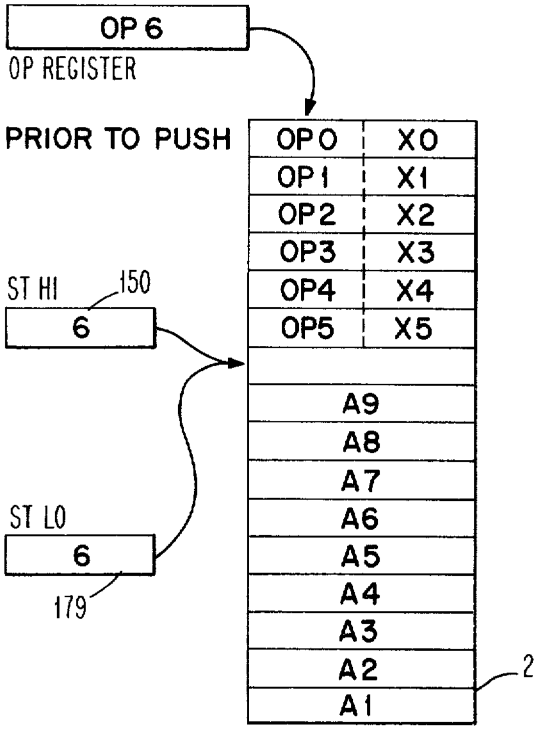
Figure 7:
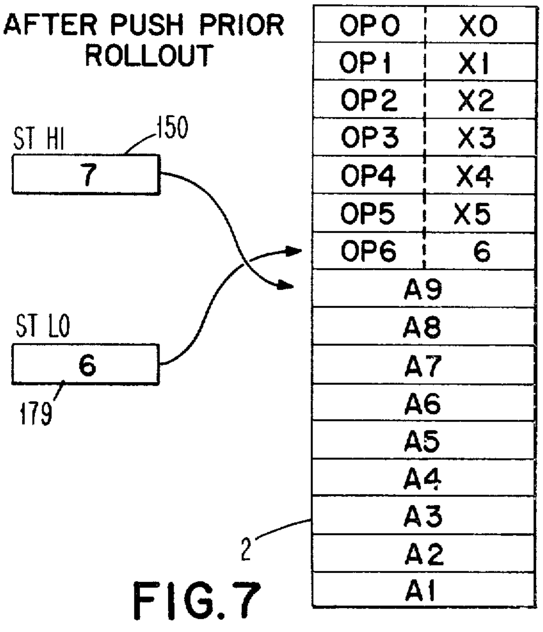
Figure 8:
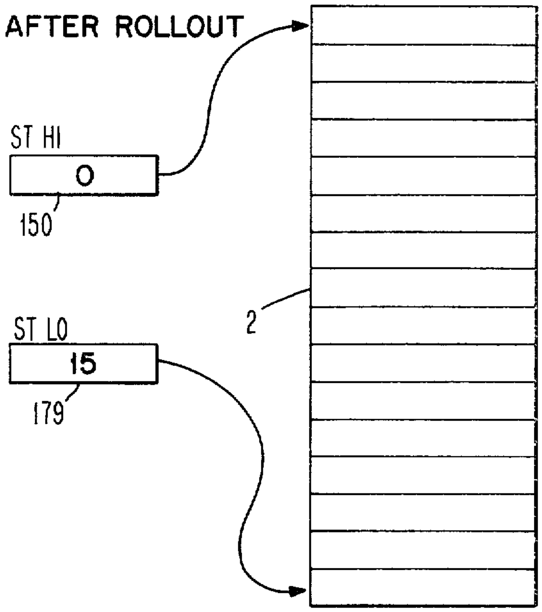

At the completion of the push cycle, stack 2 is :hecked to see if it is full; i.e. the new address STHI to ›e loaded into register 150 is passed to detection cir-:uit 160 via gate 153, bus 158, OR gate 156 and bus .57, and address STLO in register 179 is passed to de-ection circuit 160 via AND gate 167, OR gate 166 and ›us 159. If the address STHI on bus 157 is greater than he address STLO on bus 159 (e.g. FIGS. 6–8), a roll ›ut of stack 2, as previously described, is initiated at T3 ime; otherwise, operation continues. The PUSH input .o OR circuit 162, input T3 to gate 161 and the output ›f circuit 160 cause gate 161 to apply a signal to line 140 for initiating the roll out routine. FIGS. 4 and 5 il-ustrate one example of the contents of stack 2, and the ıddress values STHI and STLO in registers 150 and 179 prior to and after pushing an entry onto stack hi without a roll out. FIGS. 6–8 illustrate another example ›f the contents if a roll out occurs.

Pushing an entry on to stack lo (FIGS. 9–13)

In normal operation, operand data from either the Z register bus 18 or the SDR bus 17 is pushed on to stack lo. The microinstruction to perform this function is read from control store 30 into control register 31. The GATE STACK LO, PUSH STACK LO, and PUSH signals on lines 106, 115, and 109 respectively are raised by decoder 32*a*. Address STLO in register 179 is gated to the address register 1*a* of stack 2 via AND gate 184, OR circuit 188, AND gate 23 and OR circuit 22. Into this address is written the data on either Z bus 18 or SDR bus 17 depending on which was selected by the microinstruction in control register 31. After the access, address STLO in register 179 is decremented by one via circuit 176, AND gate 177, OR circuit 166 and AND gate 166*a*.

Figure 9:
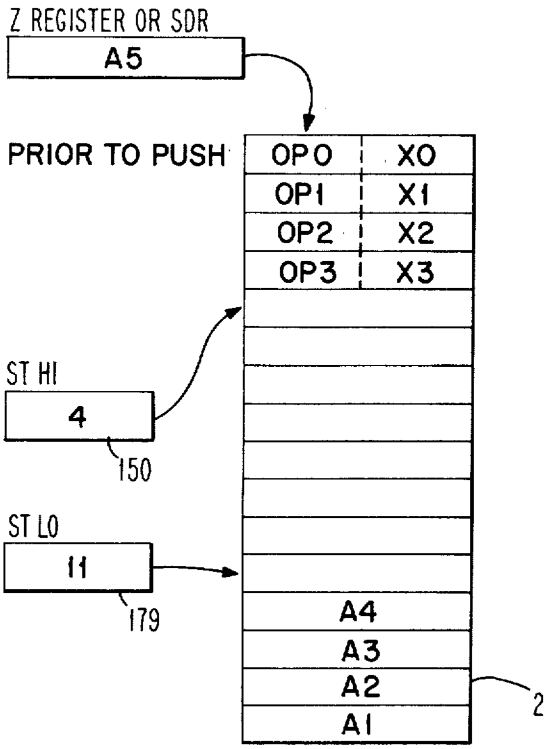
Figure 10:
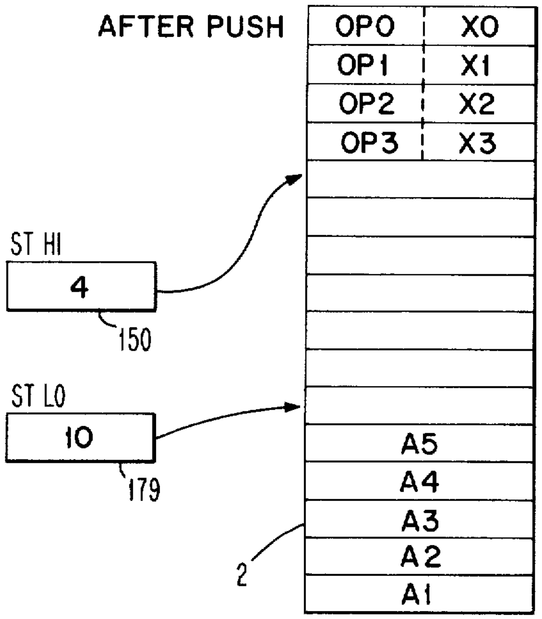
Figure 11:
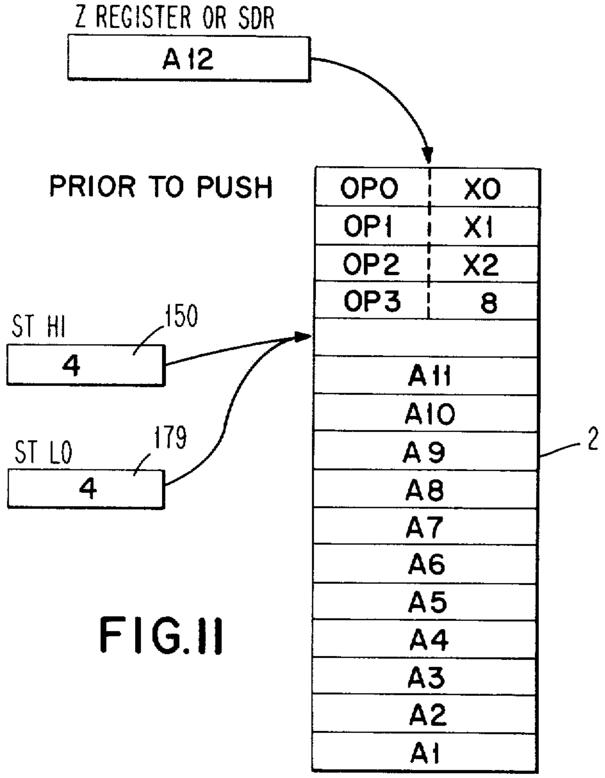
Figure 12:
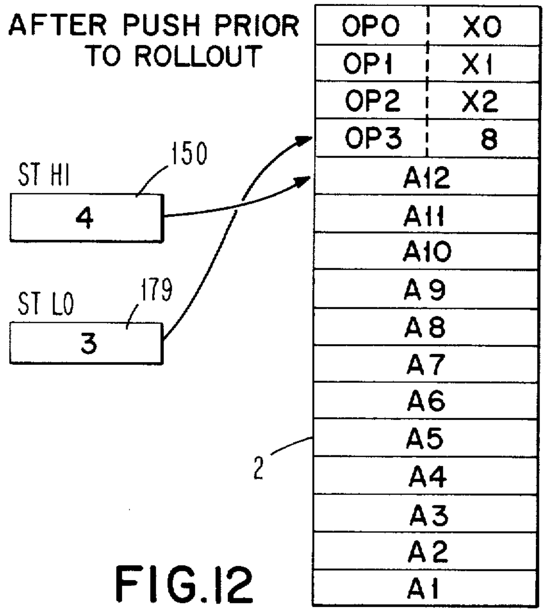
Figure 13:
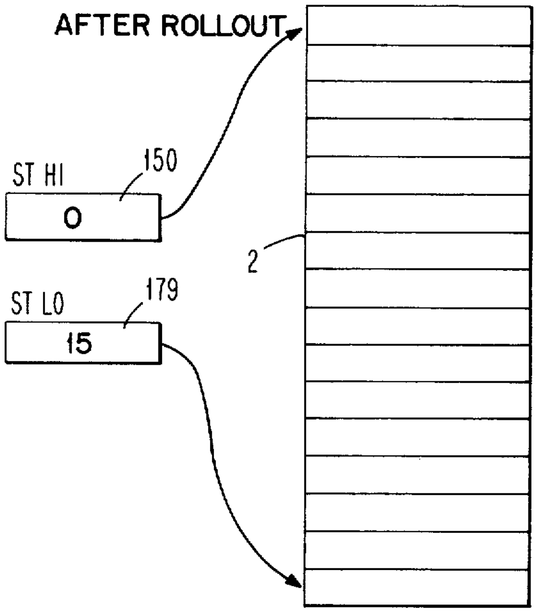

Simultaneously, stack 2 is checked to see if it is full. the new address STLO to be loaded into register 179 is passed to detection circuit 160 via OR circuit 166 and bus 159. Address STHI in register 150 is passed to detection circuit 160 via AND gate 155, OR circuit 156 and bus 157. If address STHI is greater than address STLO, a roll out of stack 2 occurs, i.e. a PUSH signal on line 109 produces an output from OR circuit 162, which with the output of detect circuit 160 and timing pulse T3 produces an output from AND gate 161; otherwise, normal operation continues. FIGS. 9, 10 illustrate the contents of stack 2, STHI register 150, STLO register 179 prior to and after pushing a data entry A5 onto stack lo without a roll out. FIGS. 11–13 illustrate the contents of stack 2 before and after a PUSH operation and after a subsequent roll out.

Popping an entry from stack hi (FIGS. 14–18 and 30–32)

A microinstruction to perform this function is read from control store 30 into control register 31. Decoder 32*a* provides the GATE STACK HI, POP STACK HI, and POP signals on lines 105, 121, and 112 respectively. If address STHI is equal to zero, this fact is detected as an underflow by −1 circuit 152, AND gate 164 and OR circuit 163 at T0 time. Circuit 163 applies a signal to line 141 to terminate the current stack cycle by terminating the signals on lines 105, 121 and 112. A roll in routine is initiated. If a roll in routine occurs, the pop cycle is repeated upon completion of the roll in, this time attempting to decrement the new value of pointer STHI in register 150 that was loaded as a result of the roll in.

Assuming no roll in occurs, address STHI in register 150 is decremented by one via −1 circuit 152 and AND gate 154 at T1 time. Upon satisfactorily decrementing address STHI in register 150, address STHI is gated (T2 time) as a stack address via blocks 24 and 22 to register 1*a*. The operation entry read from this address in stack 2 is placed on bus 20. The operator portion of the entry is set into OP register 13 and the stack low portion of the entry is set into STLo register 179.

Figure 14:
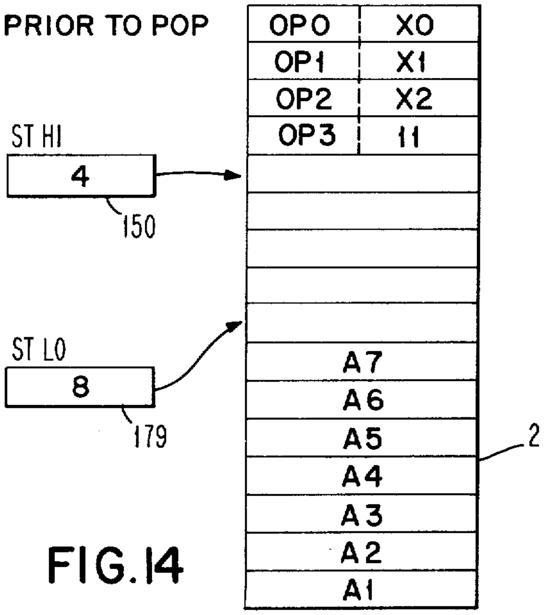
Figure 15:
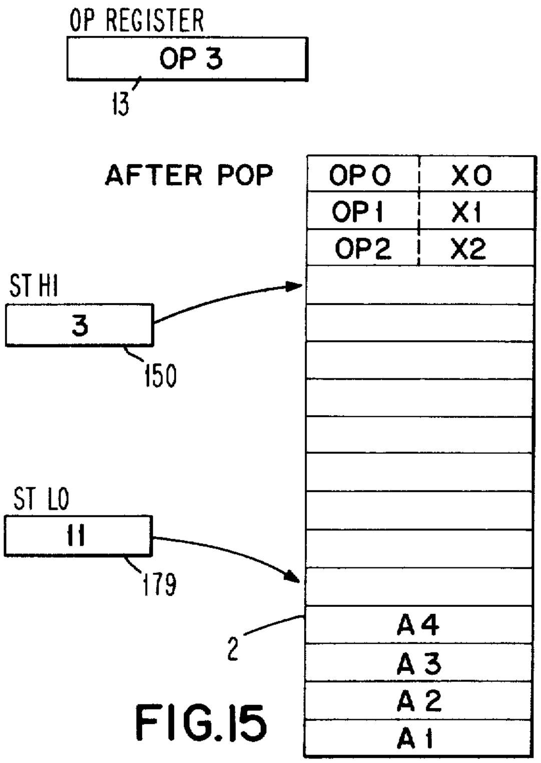
Figure 16:
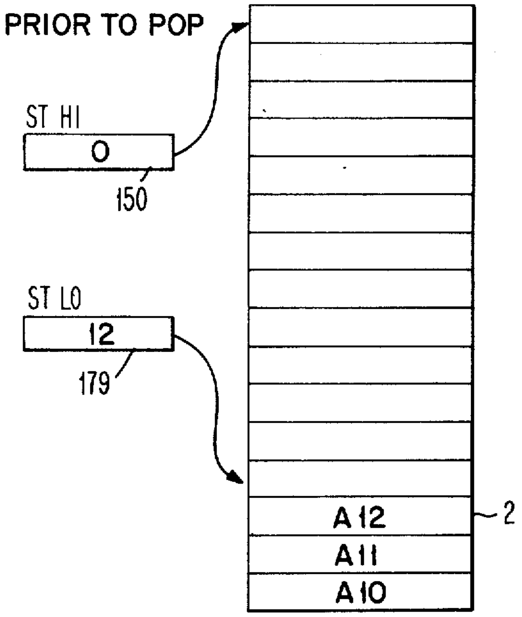
Figure 17:
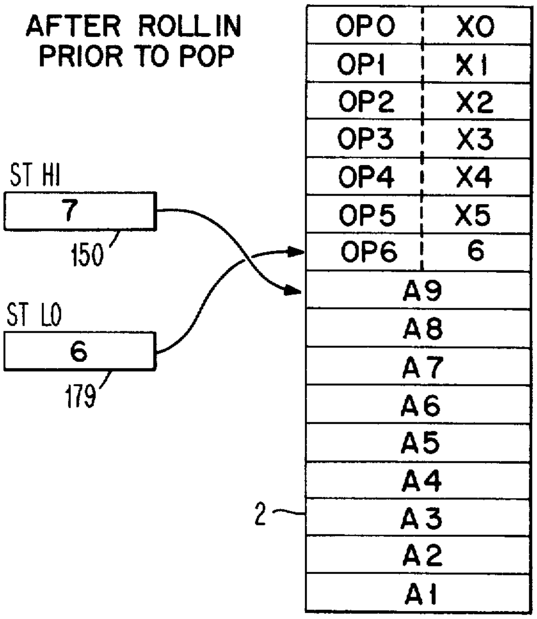
Figure 18:
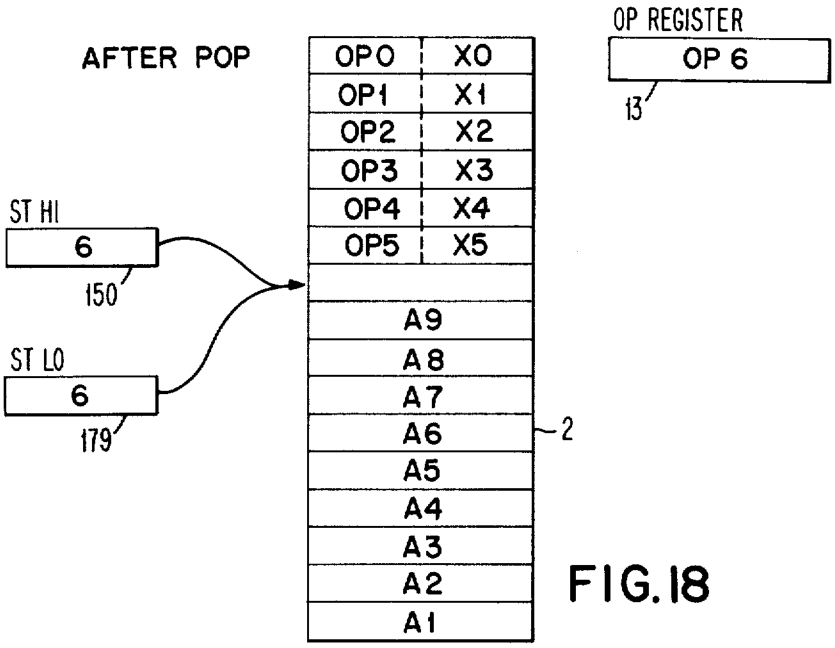

FIGS. 14, 15 illustrate the contents of stack 2 before and after popping an entry (OP3-11) from stack hi, assuming no roll in. FIGS. 16–18 illustrate the contents of stack 2 with a roll in. The previous roll out is assumed to be the one illustrated in FIGS. 6–8.

Figure 30:
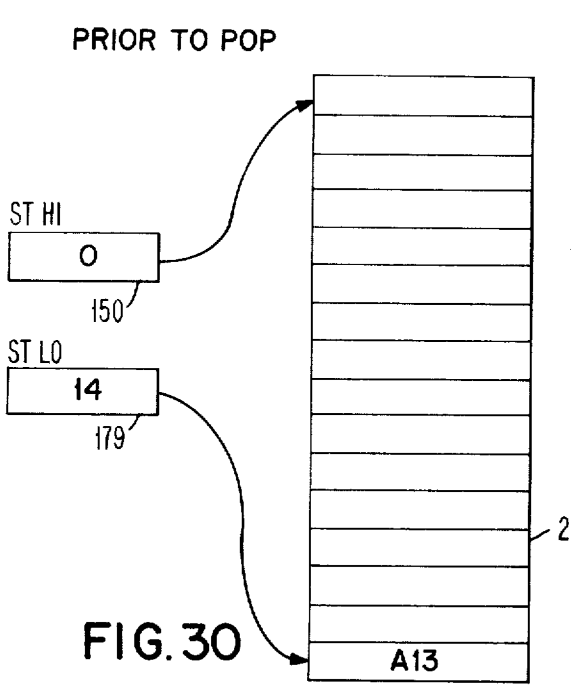
Figure 31:
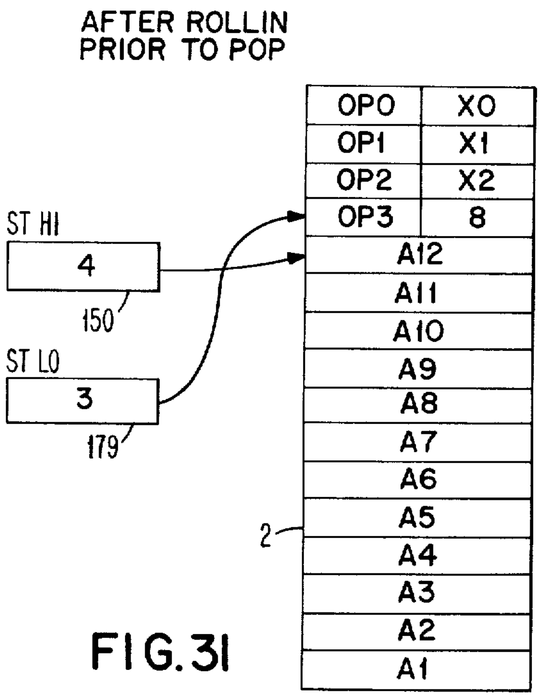
Figure 32:
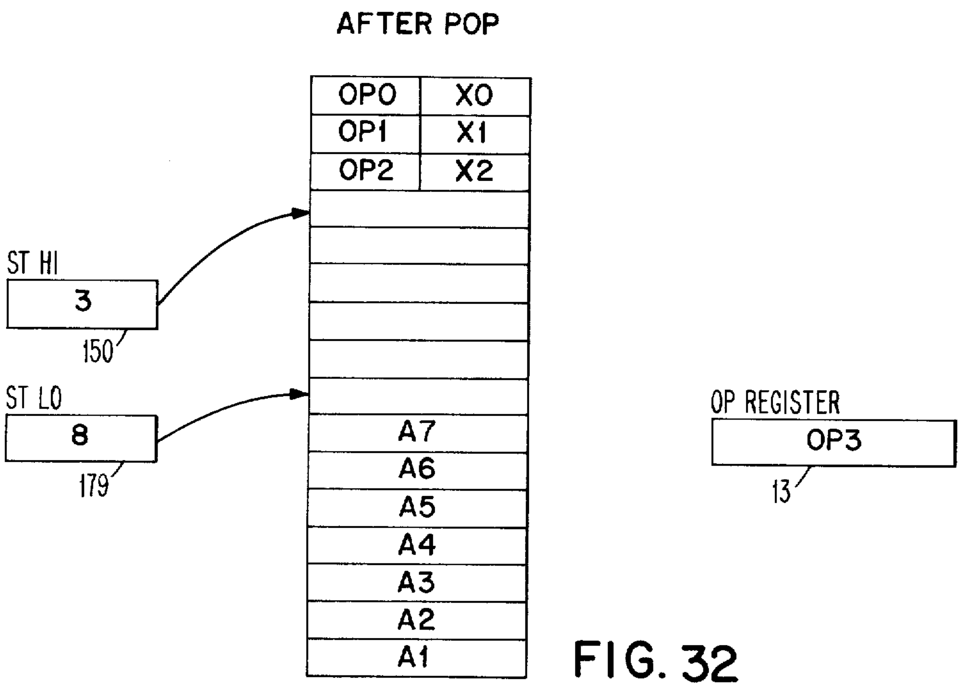

FIGS. 30–32 illustrate the contents of stack 2 with roll in assuming a different sequence of events, namely that the previous roll out is as illustrated in FIGS. 11–13.

Popping an entry from stack lo (FIGS. 19–23)

In normal operation a data entry is popped from stack lo into either register 9 or 10. The selection is specified by the microinstruction. The microinstruction to perform this pop function is read from control store 30 into control register 31. Decoder 32*a* produces the GATE STACK LO, POP STACK LO, and POP signals on lines 106, 110, and 112 respectively. If address STLO is equal to all ones (i.e. fifteen), this fact is detected at T0 time as an overflow by +1 circuit 174 (a carry signal) and transmitted as an overflow signal on line 126 to AND gate 165, the current stack cycle is terminated, and a roll in signal is generated on line 141 by circuits 165 and 163. If a roll in as previously described occurs, the pop operation is again initiated upon completion of the roll in, this time incrementing the new value in STLo register 179 that is loaded therein as a result of the roll in.

Assuming no roll in, address STLO in register 179 is incremented at T1 time by one via +1 circuit 174 and AND gate 175. Upon satisfactorily incrementing STLO register 179, address STLO is gated as a stack address via circuits 184, 188, 23, and 22. The data read from this address in stack 2 is placed on bus 20 and set into either register 9 or 10, depending on which register was selected by the microinstruction in control register 31.

Figure 19:
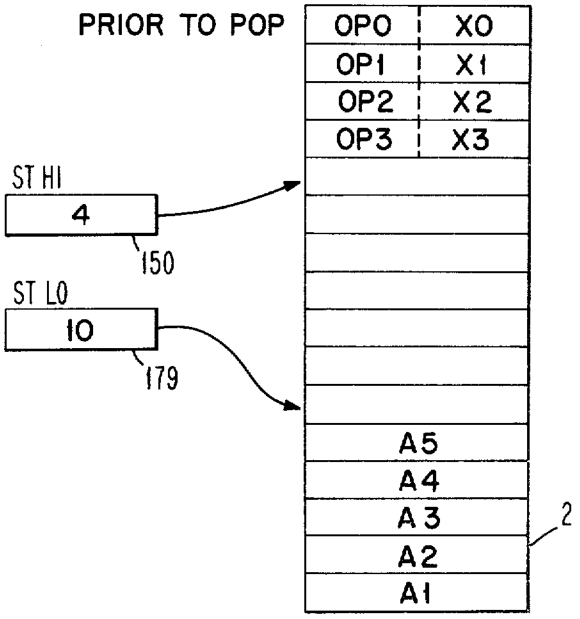
Figure 20:
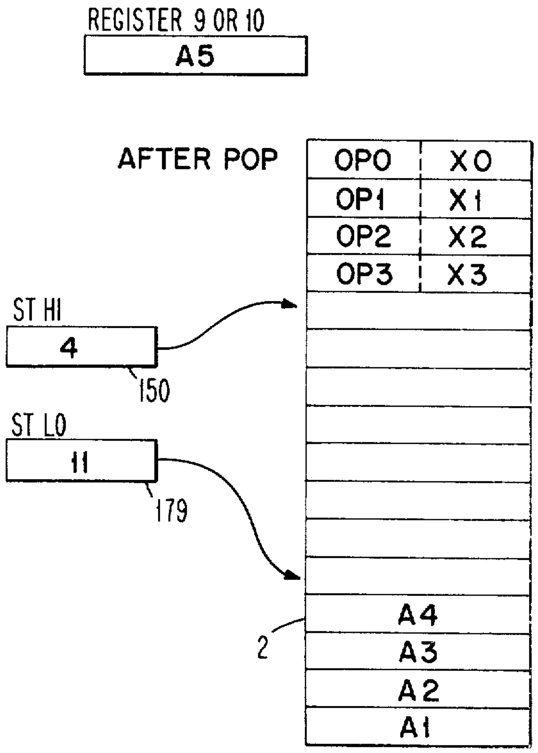
Figure 21:
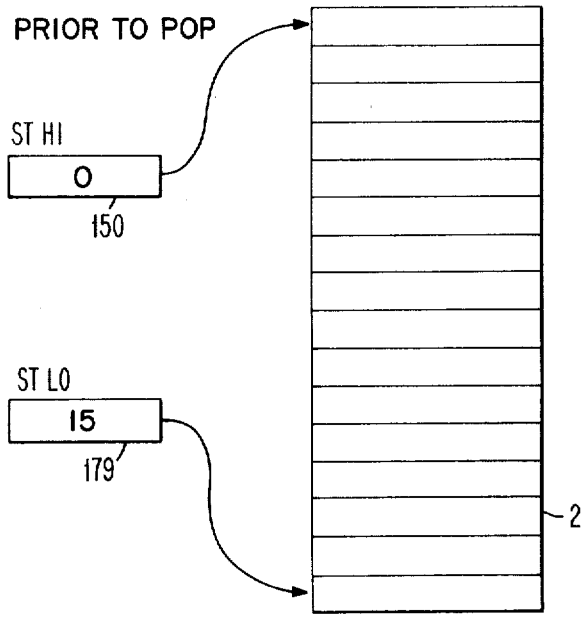
Figure 22:
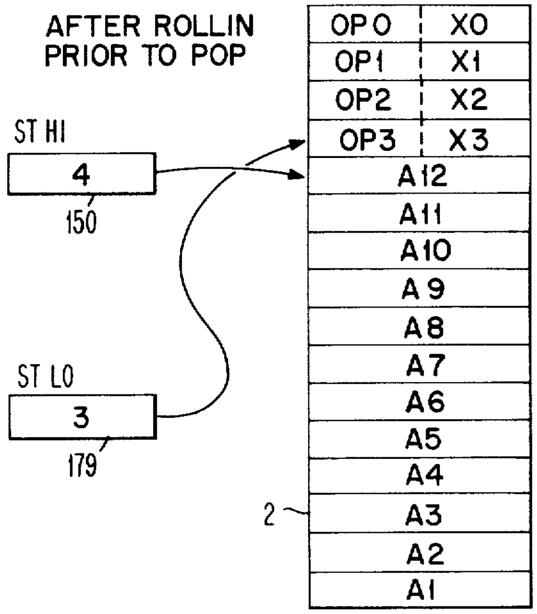
Figure 23:
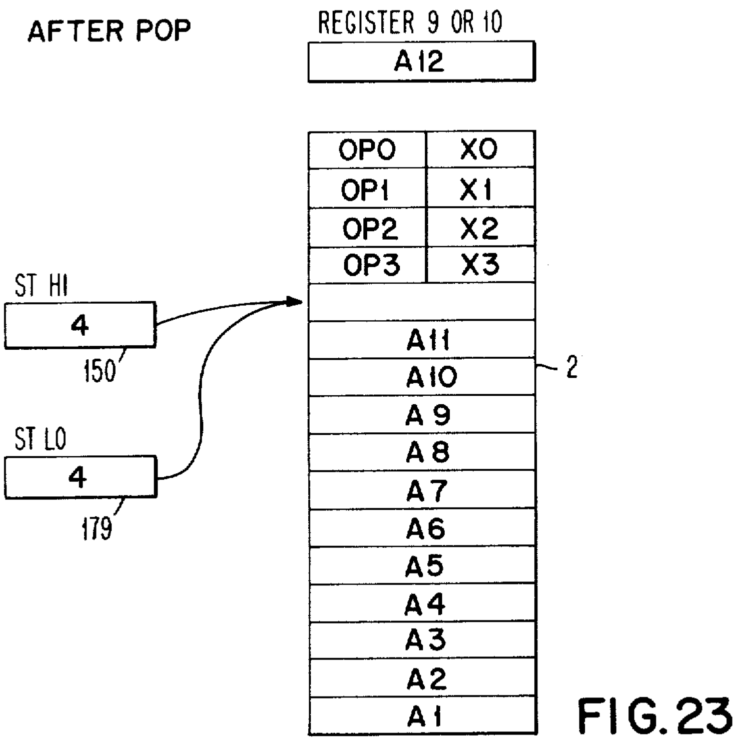
Figure 26:
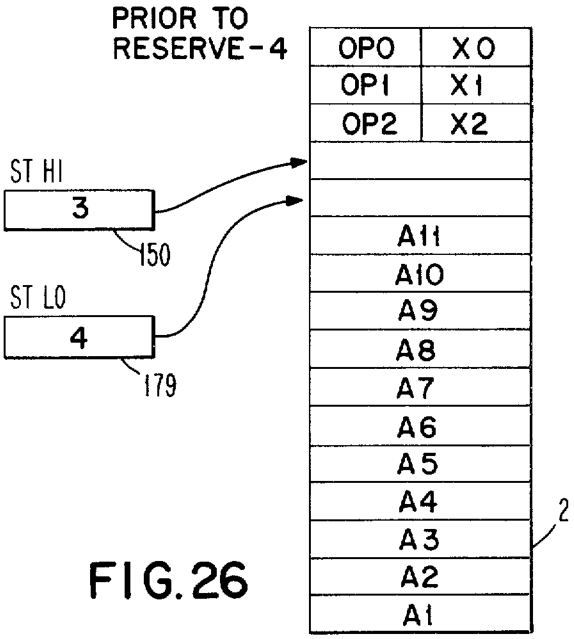
Figure 27:
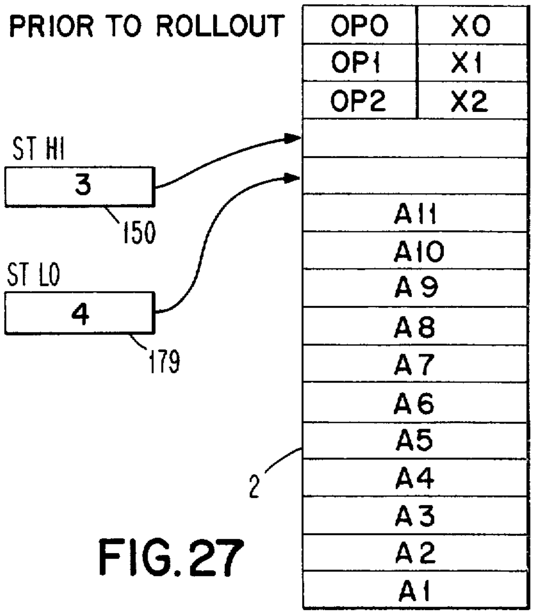
Figure 28:
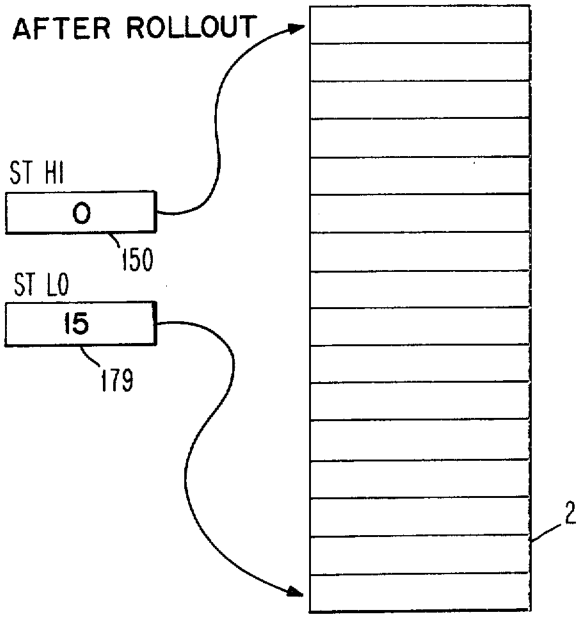
Figure 29:
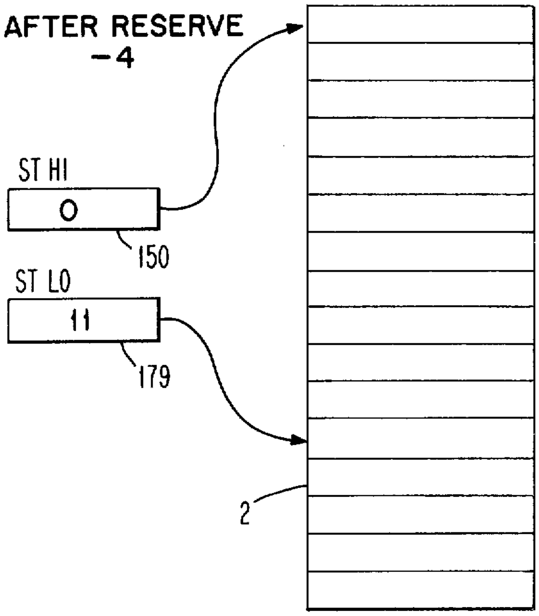

FIGS. 19, 20 illustrate the contents of stack 2 before and after popping an entry A5 from stack lo, assuming no roll in. FIGS. 21–23 illustrate the contents of stack 2 before and after popping an entry A12 with a roll in. The previous roll out is assumed to be the one illustrated in FIGS. 11–13. Entry A12 is popped from location 4 of stack 2 to register 9 or 10 after roll in is completed.

Reserving the top few entries of stack lo (FIGS. 24–29)

This invention provides for reserving for direct addressing purposes the top 1, 2, 3, or 4 entries of stack lo. Decoder 32*a* and OR block 113 activate the RESERVE STACK LO signal on line 114 and GATE STACK LO signal on line 106. Depending on the number of entries to be reserved, decoder 32*a* activates either the RESERVE TOP OF STACK LO, RESERVE TOP 2 OF STACK LO, RESERVE TOP 3 OF STACK LO, or RESERVE TOP 4 OF STACK LO signal on lines 120, 116, 117, or 118 respectively.

The prime function is to update STLo register 179 by the specified amount, checking to insure that the enlarged stack lo does not overlap stack hi. No access is made to stack 2. The STLO update path is controlled by a signal on one of the lines 120, 116, 117, and 118. If RESERVE TOP OF STACK LO signal on line 120 is up, STLO register 179 is updated via −1 circuit 176 and circuits 178, 166, and 166*a*. If RESERVE TOP 2 OF STACK LO signal on line 116 is up, STLO register 179 is updated via −2 circuit 173 and circuits 170, 166, and 166*a*. If RESERVE TOP 3 OF STACK LO signal on line 117 is up, STLO register 179 is updated via −3 circuit 172 and circuits 169, 166, and 166*a*. If RESERVE TOP 4 OF STACK LO signal on line 118 is up, STLO register 179 is updated via −4 circuit 171 and circuits 168, 166 and 166*a*.

Figure 24:
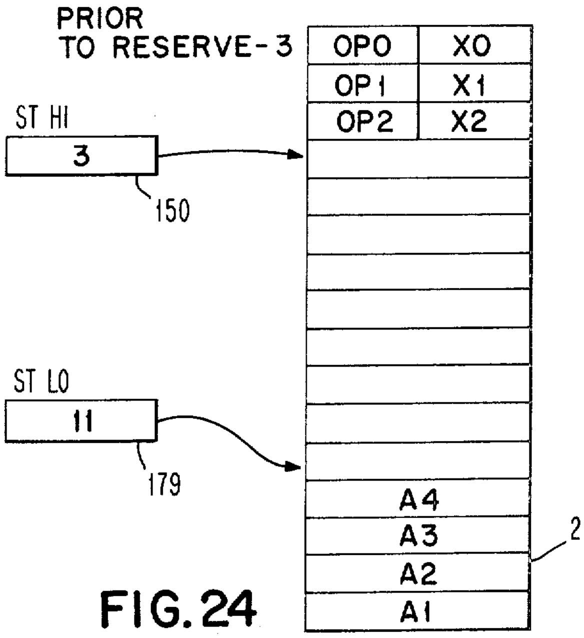
Figure 25:
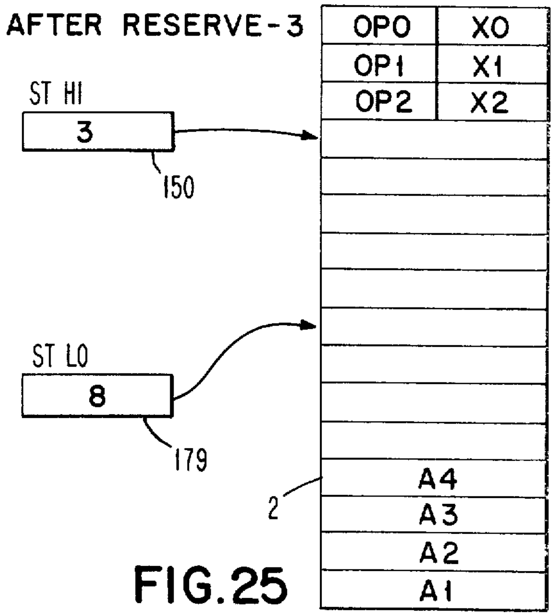

During the update function, the new value to be set into STLO register 179 is also gated via bus 159 to detect circuit 160 where it is compared with address STHI applied by AND gate 155 and OR circuit 156 to bus 157. If address STHI on bus 157 is greater than address STLo on bus 159, indicating that stack hi and lo overlap, the update of STLO register 179 is inhibited by a signal applied to gate 166*a*, via line 195, inverter 196 and AND gate 194 applied to gate 166*a;* and a roll out call is generated via AND block 161. A roll out of stack 2 occurs. Upon completion of roll out, the reserve function that caused the roll out is again attempted. This time the update of STLO register 179 is successful. FIGS. 24, 25 illustrate the contents of stack 2 before and after a reserve top 3 function with no roll out FIGS. 26–29 illustrate the contents of stack 2 before and after a reserve top 4 function with a roll out.

Referencing directly the top entries of stack lo

This particular embodiment of the invention provides for directly addressing any one of the top four entries of stack lo. The entry being addressed will always be resident in stack 2 since its location would have been previously guaranteed with the reserve function that has just been described.

A microinstruction is loaded into control register 31 from control store 30. Depending on which entry in stack lo is to be addressed, decoder 32*a* will raise either the SELECT STACK LO TOP, SELECT STACK LO −1, SELECT STACK LO −2, or SELECT STACK LO −3 signal on lines 101, 102, 103 or 104 respectively. GATE STACK LO signal 106 is also raised. The microinstruction in control register 31 specifies whether data is to be written into or read from the address gated to stack 2. Gating of the address is controlled by lines 101, 102, 103, and 104. If SELECT STACK LO TOP signal on line 101 is up, address STLO in register 179 is gated via +1 circuit 174 and circuits 185, 188, 23, and 22. If SELECT STACK LO −1 signal on line 102 is up, address STLo in register 179 is gated via +2 circuit 182 and circuits 186, 188, 23 and 22. If SELECT STACK LO −2 signals on line 103 is up, address STLo in register 179 in gated via +3 circuit 183 and circuits 187, 188, 23, and 22. If SELECT STACK LO −3 signal on line 104 is up, address STLO in register 179 is gated via +4 circuit 200 and circuits 201, 188, 23, 22.

While the invention has been particularly shown and described with reference to a preferred embodiment thereof, it will be understood by those skilled in the art that various changes in form and details may be made therein without departing from the spirt and scope of the invention.

I claim:

1. In a data processing system, the combination comprising a stack having a plurality of addressable entry registers having sequential addresses between a predetermined low and high values, means including a first pointer register for storing entries of a first type in the entry registers in ascending address order from said low value, means including a second pointer register for storing entries of a second type in the entry registers in descending address order from said high value, means for removing the entries of each type from the stack for processing in a last-in-first-out order, a store slower in speed than the stack for storing overflow entries from the stack when the latter is full, means responsive to the pointer values during the storing of an entry on the stack when the values of the pointers bear a predetermined numeric relationship indicative of a full stack condition for rolling out stack entries and the current first and second pointer values to the slower speed store, means initializing the pointers to said predetermined low and high values after each roll out, means responsive to the pointer values during the attempted removal of an entry from the stack, when the value of one of the pointers indicates that there is no corresponding entry on the stack, for rolling in needed entries and the pointer values from the store to the stack and pointer registers respectively, means for reserving a directly addressable area in the stack for storing one of the last mentioned types of entries, means for directly addressing any one of a plurality of entry registers in said reserved area when the respective pointer value points to the top of said reserved area.

2. The combination of claim 1 wherein the reserving means comprises means for a changing the value of the pointer corresponding to said one type of entry by a value $n$.

3. The combination of claim 2 wherein the direct addressing means comprises means for changing the last-mentioned pointer value by a value between 1 and $n$.

4. The combination of claim 1 wherein the means for toring the entries other than said one type of entry furner includes means for storing, with each entry of the other type, the current pointer value for the one type of entry when said other type of entry is stored in its entry register, and wherein said removing means further includes means for storing said current pointer value in its pointer register when the corresponding other type of entry is removed from its entry register.

5. In a data processing system, the combination comprising a stack having a plurality of addressable entry registers having sequential addresses between predetermined low and high values, means including an operator pointer register for storing operator entries in the registers in ascending address order from said low value, means including an operand pointer for storing operand entries in the registers in descending address order from said high value, means for removing the operand and operator entries from the stack for processing, each in a last-in-first-out order, a store slower in speed than the stack for storing overflow entries from the stack when the latter is full, means responsive to the pointer values during the storing of an entry on the stack when the values of the pointers bear a predetermined numeric relationship indicative of a full stack condition for rolling out stack entries and the current pointer values to the slower speed store, means initializing the pointers to said predetermined high and low values after each roll out, means responsive to the pointer values during the attempled removal of an entry from the stack, when the value of one of the pointers indicates that there is no corresponding entry on the stack, for rolling in, needed entries and the pointer values from the store to the stack and pointer registers respectively.

means for reserving a directly addressable area in the stack for storing the last mentioned entries, and means for directly addressing any one of a plurality of entry registers in said reserved area when the respective pointer value points to the top of said reserved area.

* * * * *